Patented Dec. 30, 1924.

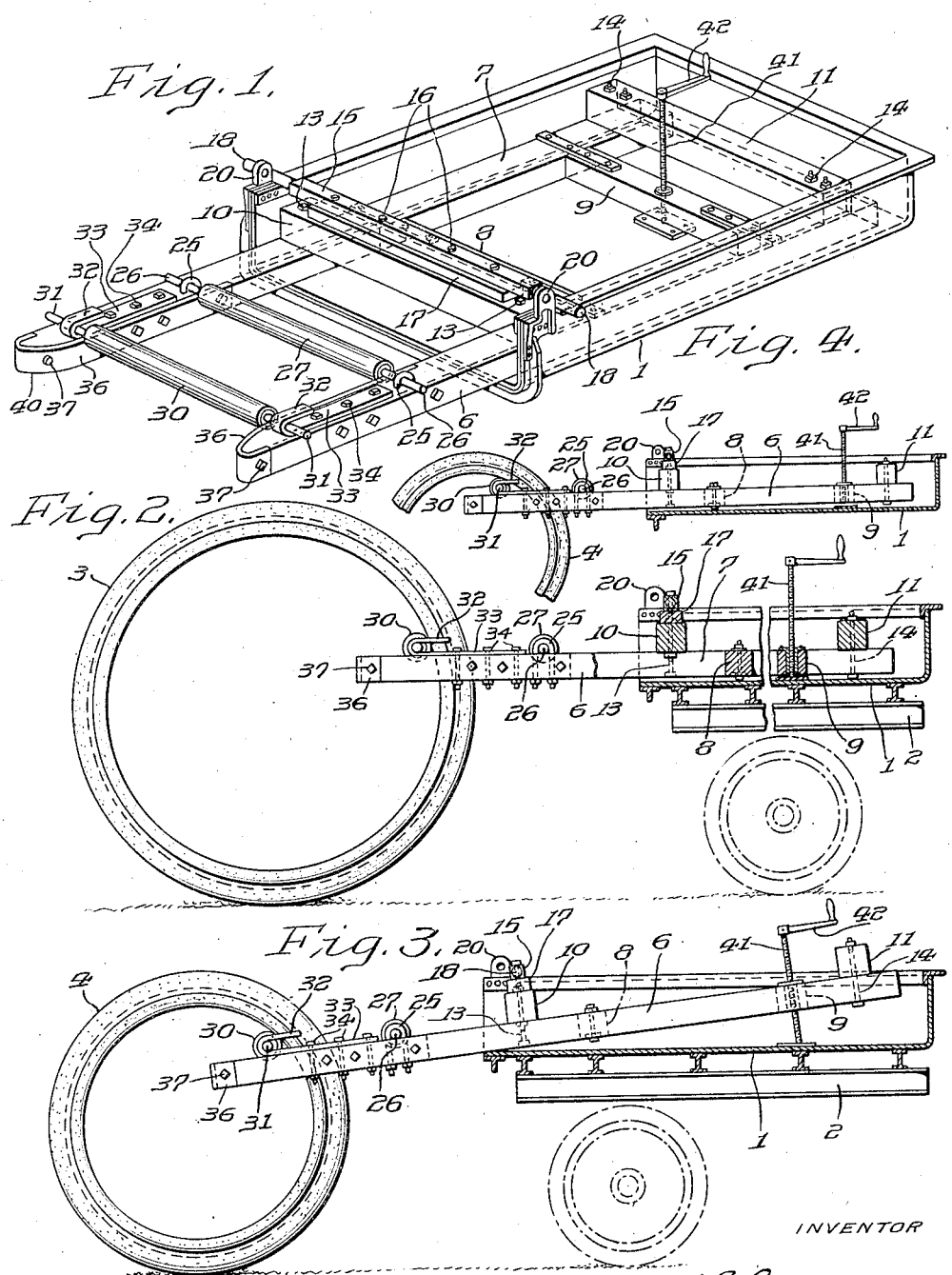

1,520,699

UNITED STATES PATENT OFFICE.

SAMUEL C. CURRIDEN, OF CLARKSBORO, NEW JERSEY.

MEANS FOR TRANSPORTING PIPE SECTIONS OF LARGE DIAMETERS.

Application filed February 21, 1924. Serial No. 694,198.

*To all whom it may concern:*

Be it known that I, SAMUEL C. CURRIDEN, a citizen of the United States, and a resident of Clarksboro, in the county of Gloucester and State of New Jersey, have invented an Improvement in Means for Transporting Pipe Sections of Large Diameters, of which the following is a specification.

In the transporting of sections of pipe of external diameters ranging from around five to nine feet it heretofore has been the practice to load the same on to a wagon or truck. Such sections are quite heavy and in consequence the handling of the same in the loading and unloading thereof has required the employment of a considerable number of men involving relatively heavy expense.

It is the general object of the present invention to provide novel means whereby relatively short sections of pipe of large diameter, both interior and exterior, may be transported from place to place at a greatly reduced cost.

It is also an object of the invention to provide an ordinary truck with adjustable means whereby sections of pipe of the character indicated may be transported by such truck from place to place in a convenient and economical manner.

A further object of the invention is to provide a frame structure which is adapted to be pivotally mounted upon the body or other part of a truck which structure is provided with means for engagement with the interior of a section of pipe of large diameter whereby said section may be transported with facility and economically from one place to another.

Other objects and advantages of the invention will be pointed out in the detailed description thereof which follows or will be apparent from such description.

In order that the invention may be readily understood and its advantages from a practical standpoint fully appreciated, reference may be had of the accompanying drawing in which I have illustrated one mechanical form of embodiment thereof. However, it will be understood that the invention is susceptible of embodiment in other forms of construction than that shown, and that changes in the details of construction may be made within the scope of the claims without departing from the said invention.

In the drawing:

Fig. 1 is a view in perspective showing a combined frame structure and truck body embodying the invention;

Fig. 2 is a view partly in side elevation and partly in central vertical section;

Fig. 3 is a view showing the frame structure in elevation and in different position from what the same is shown in Fig. 2, in which position it is adapted for engagement with a pipe of smaller section than is shown in Fig. 1, and also showing the truck body in section; and Fig. 4 is a view similar to that shown in Fig. 3 except that the said frame structure is shown in different position.

Referring to the drawing: 1 designates the body of an automobile truck of known structure supported upon a frame 2 which in turn is supported upon wheels (only one of which is shown) in the usual known manner. Any other form of vehicle which may be suitable may be employed.

For the purpose of engaging pipe sections of large diameter of the character shown at 3 and 4 in Figs. 2 and 3, I have provided a frame structure which is mounted pivotally upon the top edges adjacent the rear ends of the opposite sides of the truck body 1.

The frame structure comprises the side members 6 and 7 which are bound together by the cross-timbers or bars 8 and 9 which are situated in the same plane as and intermediate the side members 6 and 7. The said side members are also bound together by the cross-timbers or cross-bars 10 and 11 which are located upon the top thereof and which are connected thereto by means of bolts 13 and 14 as shown. The cross-timber of bar 11 not only operates as an additional connecting means between the side members 6 and 7 but also as a weight as will be apparent as the description proceeds.

The cross-timber of cross-bar 10 operates not only as an additional fastening means between the sides 6 and 7, but also as a means for connecting the pivot bar 15 to the side members 6 and 7. The said pivot bar 15 is connected to the cross-timber or bar 10 by means of bolts 16. In the construction as shown a filler 17 is interposed between the pivot bar 15 and the crosstimber 10. The filler bar 15 is provided with cylindrical extensions or trunnions 18 which rest upon the top edges of the opposite sides of the truck body, adjacent the rear ends thereof, but in front of projections 20, which extend above the said edges, as shown.

The rear ends of the side members 6 and 7 of the frame structure project a considerable distance beyond the rear end of the truck body. These projecting end portions are provided with staples as indicated at 25 within which are retained the cylindrical end portions or trunnions 26 of a cylindrical cross-bar 27.

Situated rearwardly of the cylindrical member 27 is a cylindrical member 30 having trunnions 31 which are adapted to be mounted in hooks 32 formed by bending upwardly and then forwardly the rear end portions of bars 33 which are secured by bolts 34 to the top sides of the projecting rear end portions of the side members 6 and 7.

For the purpose of protecting and shielding the inner sides of the rear end portions of the side members 6 and 7, I have provided facing plates 36 which are secured to the said members 6 and 7 by means of bolts 37. The rear ends of these plates are bent around and enfold the rear ends of the members 6 and 7 as is clearly shown in the drawing. It will also be observed that the inner sides of the rear ends of the members 6 and 7 are beveled outwardly as indicated at 40. The purpose of such outward beveling will be apparent as the description proceeds.

When it is desired to transport a section of pipe, such as is shown in Fig. 2, the cylindrical member 30 is removed from the hooks 32 and the truck is then backed up so as to position the rearwardly projecting end portions of the side members 6 and 7 upon opposite sides of and adjacent the opposite ends of said section, as is clearly shown in Fig. 2. Thereafter the cylindrical member 30 is returned to position as is shown in both Figs. 1 and 2, and thereby the frame structure becomes interlocked with the said section 3. It will be noted that when the frame structure occupies a substantially horizontal position the cylindrical member 30 contacts with the interior of the section of pipe 3, a short distance above a horizontal plane through the axis of the said section, so that as the truck moves forward the cylindrical member 30 pulls against the interior of the pipe section 3 in a plane above the horizontal central plane of said section and causes a combined rolling and dragging motion thereof.

The larger sections of pipe such as are shown in Fig. 3 are strong enough to withstand the strain and shocks due to the movement thereof over rough places in the road or street or other traffic-way, above which the same is being transported. But in the case of smaller sections, such as shown in Fig. 3, it is desirable that the construction be such as to tend to lift the pipe section as it is carried forward, particularly as it may be carried over a depression or rut in the road, street or other traffic-way.

In order that the rear end of the frame structure may be conveniently lowered into position to facilitate its engagement with the section of pipe 4, of smaller diameter, I have provided an adjusting screw 41 in engagement with the cross-timber or bar 9, previously referred to. Actuation of the screw 41 may be effected by means of the handle 42. By turning the screw 41 in a clockwise direction the lower end thereof is caused to project below the cross-member 9 to thereby effect upward movement of the front end of the said frame and downward movement of the rear end thereof. At such time the frame pivots upon the trunnions 18.

When the frame has been adjusted into the position shown in Fig. 3, the cylindrical member 30 having been previously removed, the truck is backed toward the section 4 so as to position the rear end portions of the sides 6 and 7 of the frame structure upon opposite sides of the opposite ends of the said section 4. This having been done, the cylinder 30 is placed in position with the trunnions 31 thereof in engagement with the hooks 31. The screw 41 is then turned in an anti-clockwise direction so as to return it to the position as indicated in Fig. 4, whereupon the frame comprising the side members 6 and 7 returns to a substantially horizontal position as shown in Fig. 4 with the cylinder 30 in engagement with the interior of the pipe section 4 near the highest point of its interior cylindrical surface.

It will be seen that as the truck moves forward with the cylinder 30 in engagement with the interior of the pipe section 4, the latter is carried forward with a partially rotating and dragging motion. It will also be seen that in case the section should be carried over a hole or rut in the road or traffic-way the jar due to the dropping of the same into such hole or rut will be greatly decreased, because the speed of its falling motion would be substantially retarded due to its engagement with the cylinder 30 thereby rendering it necessary for the combined weight of the section 3 and the rear end portion of the frame to overcome and overbalance the weight of the front portion, including the cross-timber 11. In other words, in case the section should be carried across a rut or hole in the traffic-way it would be eased down and in consequence the danger of breakage or fracture would be eliminated. The purpose of the cylinder 27, previously referred to, is to prevent the cylinder rolling forward against the rear end portion of the truck in cases where the truck with the section of pipe attached thereto might be descending a steep hill; also when the vehicle is moved backward the said cylinder will contact with the section of pipe in engagement with the cylinder 30 and cause it to roll or move backward.

It has been found that by the employment of a structure embodying my invention sections of pipe of large diameters of the character indicated may be transported at a very great saving of cost as compared with the method heretofore in use in which such sections of pipe are loaded on to trucks or other vehicles. The method heretofore in use of handling pipe sections of the character indicated requires a greater or less number of men, depending upon the size and weight of the sections, whereas by the employment of my invention only one man, the driver or chauffeur of a truck or other vehicle, is necessary to be employed.

Having thus described my invention what I claim and desire to secure by Letters Patent is:

1. In means for transporting sections of pipe of large diameters, the combination of a vehicle, a member pivotally supported upon said vehicle and projecting from the rear thereof, and means for engaging the interior of a pipe section to connect the same with the said member whereby when the said vehicle is moved forward the said pipe section is drawn forward.

2. In means for transporting sections of pipe of large diameters, the combination of a vehicle, a frame structure pivoted thereon and projecting from the rear thereof, a cross member removably connected with and supported upon said structure adjacent its rear end, which member is adapted to be inserted through a pipe section and to be reconnected with said structure, and being also adapted to contact with the interior of said section along a line in a horizontal plane above a horizontal plane through the axis thereof.

3. In means for transporting sections of pipe of large diameters, the combination of a vehicle, a frame structure comprising side members the rear ends of which project from the rear of said vehicle, trunnions carried by said structure which trunnions have pivotal engagement with said vehicle for supporting said structure, and means having detachable connection with the rear end portion of said side members for engaging with the interior of a pipe section of large diameter whereby when the said vehicle moves forward the said section is drawn forward.

4. In means for transporting sections of pipe of large diameters, the combination of a vehicle, a structure pivotally mounted on said vehicle and having spaced members projecting rearwardly from the said vehicle, a cross-member detachably and rotatably mounted upon the rear end portions of said spaced members, the said spaced rearwardly extending members being adapted to occupy positions adjacent the opposite ends of a pipe section and the said cross member being adapted to engage the interior of said section in a horizontal plane above a horizontal plane through the axis of said section, and means for causing pivotal movement of the pivotally mounted structure to lower and raise the said rearwardly extending spaced portions.

5. In means for transporting sections of pipe of large diameters, the combination of a vehicle having a body, a frame structure comprising side members the rear ends of which project a distance beyond the rear end of the said body, trunnions having connections with the said frame structure and resting upon the top edges of the sides of said body adjacent the rear ends thereof, a cross-member having detachable and rotatable connection with the rearwardly projecting ends of the said side members and adjusting means having connection with the front end portion of the said frame structure for pivotally adjusting the same.

6. In means for transporting sections of pipe of large diameters, the combination of a vehicle and means pivotally mounted thereon, the said means having a portion which projects rearwardly from said vehicle which portion is adapted to be engaged with the interior of a pipe section of large diameter.

7. In means for transporting sections of pipe of large diameters, the combination of a vehicle with means pivotally mounted intermediate its ends thereon, the said means having a portion which projects rearwardly from the said vehicle which is adapted to engage the interior of a section of pipe and which tends to lift the same when the vehicle is moved forward.

In testimony that I claim the foregoing as my invention I have hereunto signed my name this 19th day of February, A. D., 1924.

SAMUEL C. CURRIDEN.

Witness to signature:
WM. H. HOFFMAN.